(12) United States Patent
Shida

(10) Patent No.: US 6,519,619 B1
(45) Date of Patent: Feb. 11, 2003

(54) CIRCUIT FOR GENERATING PERIODIC FUNCTION

(75) Inventor: Hiroaki Shida, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/488,531

(22) Filed: Jan. 21, 2000

(30) Foreign Application Priority Data

Jan. 26, 1999 (JP) .......................................... 11-016960

(51) Int. Cl.$^7$ ................................................ G06F 1/02
(52) U.S. Cl. ...................................... 708/272; 708/276
(58) Field of Search ............................... 708/272, 274, 708/275, 276, 277

(56) References Cited

U.S. PATENT DOCUMENTS

| | | | | | |
|---|---|---|---|---|---|
| 3,772,681 A | * | 11/1973 | Skingle | ....................... | 327/106 |
| 4,809,577 A | * | 3/1989 | Fujita | .......................... | 704/258 |
| 5,892,692 A | * | 4/1999 | Whikehart et al. | .......... | 327/106 |
| 5,937,438 A | * | 8/1999 | Raghunath et al. | .......... | 708/272 |

FOREIGN PATENT DOCUMENTS

| | | |
|---|---|---|
| JP | 60-37486 | 8/1985 |
| JP | 7-43620 | 5/1995 |

* cited by examiner

Primary Examiner—David H. Malzahn
(74) Attorney, Agent, or Firm—Sughrue Mion, PLLC

(57) ABSTRACT

A circuit for digitally generating a series of encoded sampling values of a periodic function by virtue of ROM table conversion, include (a) a function ROM in which an amplitude associated with one-fourth of a period of a periodic function is stored, and (b) an address counter which generates an address signal to be input into the function ROM. The address counter includes an accumulator, a first register which is externally controllable, an adder which adds an output transmitted from the accumulator to an output transmitted from the first register, and transmits the sum to the accumulator, an address-conversion circuit receives a first output transmitted from the adder, and converts the first output into the address signal, the first output being a bit output other than a second uppermost bit output among bit outputs transmitted from the adder, a second register which stores therein an output transmitted from the address-conversion circuit, and a zero-cross flag control circuit which receives an uppermost bit output transmitted from the accumulator, and makes logic control. An output transmitted from the second register is input into the function ROM as the address signal. The function ROM has the $(2^P+1)$ number of address regions where P indicates the number of bits other than a second uppermost bit output among outputs transmitted from the adder. The series of encoded sampling values is defined as a sum of an output transmitted from the function ROM and an output transmitted from the zero-cross flag control circuit.

18 Claims, 10 Drawing Sheets

FIG. 2
PRIOR ART

| SAMPLING CLOCK ( Nos. ) | VALUES IN ACCUMULATOR 5 | MSB | VALUES IN FIRST REGISTER 7 |
|---|---|---|---|
| 0 | 0 0 0 0 | 0 | 0 0 |
| 1 | 0 0 0 1 | 0 | 0 1 |
| 2 | 0 0 1 0 | 0 | 1 0 |
| 3 | 0 0 1 1 | 0 | 1 1 |
| 4 | 0 1 0 0 | 0 | 1 1 |
| 5 | 0 1 0 1 | 0 | 1 0 |
| 6 | 0 1 1 0 | 0 | 0 1 |
| 7 | 0 1 1 1 | 0 | 0 0 |
| 8 | 1 0 0 0 | 1 | 0 0 |
| 9 | 1 0 0 1 | 1 | 0 1 |
| 10 | 1 0 1 0 | 1 | 1 0 |
| 11 | 1 0 1 1 | 1 | 1 1 |
| 12 | 1 1 0 0 | 1 | 1 1 |
| 13 | 1 1 0 1 | 1 | 1 0 |
| 14 | 1 1 1 0 | 1 | 0 1 |
| 15 | 1 1 1 1 | 1 | 0 0 |
| 16 | 0 0 0 0 | 0 | 0 0 |

VALUES STORED IN FUNCTION ROM

OUTPUTS FROM FUNCTION ROM

FIG. 9

| SAMPLING CLOCK (Nos.) | a7 FROM ADDER 4 | a2 | a1 | a3 | a8 FROM ACCUMULATOR 5 | a5 FROM MSB | a6 | a4 FROM SECOND REGISTER 7 |
|---|---|---|---|---|---|---|---|---|
| 0  | 0001 | 0 | 0 | 001 | 0000 | 0 | 0 | 000 |
| 1  | 0010 | 0 | 1 | 010 | 0001 | 0 | 0 | 001 |
| 2  | 0011 | 0 | 1 | 011 | 0010 | 0 | 0 | 010 |
| 3  | 0100 | 1 | 0 | 100 | 0011 | 0 | 0 | 011 |
| 4  | 0101 | 1 | 0 | 101 | 0100 | 0 | 0 | 100 |
| 5  | 0110 | 1 | 1 | 110 | 0101 | 0 | 0 | 011 |
| 6  | 0111 | 1 | 1 | 111 | 0110 | 0 | 0 | 010 |
| 7  | 1000 | 0 | 0 | 000 | 0111 | 0 | 0 | 001 |
| 8  | 1001 | 0 | 0 | 001 | 1000 | 1 | 1 | 000 |
| 9  | 1010 | 0 | 1 | 010 | 1001 | 1 | 1 | 001 |
| 10 | 1011 | 0 | 1 | 011 | 1010 | 1 | 1 | 010 |
| 11 | 1100 | 1 | 0 | 100 | 1011 | 1 | 1 | 011 |
| 12 | 1101 | 1 | 0 | 101 | 1100 | 1 | 1 | 100 |
| 13 | 1110 | 1 | 1 | 110 | 1101 | 1 | 1 | 011 |
| 14 | 1111 | 1 | 1 | 111 | 1110 | 1 | 1 | 010 |
| 15 | 0000 | 0 | 0 | 000 | 1111 | 1 | 1 | 001 |
| 16 | 0001 | 0 | 1 | 001 | 0000 | 0 | 0 | 000 |

CIRCUIT FOR GENERATING PERIODIC FUNCTION

BACKGROUND OF THE INVENTION

1. Field of the Invention

The invention relates to a circuit for generating a periodic function, and more particularly to a circuit for digitally generating a periodic function in a signal processing circuit which is required to generate a periodic function, such as an image signal processing circuit and an aural signal processing circuit.

2. Description of the Related Art

Digital ROM table conversion is well known in the art as a method of generating a periodic function such as a sine wave. When a sine wave is to be generated, a sine wave function is stored in a function ROM in the range of a period, and addresses of the function ROM is periodically controlled. As a result, there can be generated a sine wave having a desired frequency.

For instance, Japanese Patent Publication No. 60-37486 has suggests a sine wave generator which stores a sine wave function in the range of a phase associated with one-fourth of a period. Values of the sine wave function in the rest of a phase are obtained by adding an external circuit.

Japanese Patent Publication No. 7-43620 suggests a circuit for generating a periodic function to make an improvement in the above-mentioned sine wave generator. The suggested circuit is designed to be able to generate a sine wave function in a period only by storing a sine wave function in a function ROM in a degree associated with one-fourth of a period, ensuring that a capacity of the function ROM is made four times smaller.

The circuit suggested in Japanese Patent Publication No. 7-43620 is illustrated in FIG. 1.

As illustrated in FIG. 1, the circuit is comprised of an address counter 1 and a function ROM 2. The address counter 1 is comprised of a first register 3, an adder 4, an accumulator 5, a control circuit 14 for inverting a bit, and a second register 7.

FIG. 2 is a table showing an operation of the circuit. FIG. 3A is a graph showing a relation between addresses of the function ROM 2 and amplitudes to be stored in the function ROM 2, found when a sine wave function is to be stored in the function ROM 2, and FIG. 3B shows waveforms of outputs transmitted from the function ROM 2 in the case that a numeral of 2 is stored in the first register 3.

The adder 4 adds a value stored in the first register 3 to a value stored in the accumulator 5, and transmits the sum to the accumulator 5. The accumulator 5 latches the received sum at a sampling period.

The control circuit 14 receives a first bit output transmitted from the adder 4. Herein, the first bit output is a bit output other than a second uppermost bit among bit outputs transmitted from the adder 4. The control circuit 14 inverts the received first bit output or allows the received first bit output to pass therethrough without inverted, in accordance with a second uppermost bit transmitted from the adder 4. An output transmitted from the control circuit 14 is latched by the second register 7 at a sampling period.

The function ROM 2 stores therein a periodic function value associated with one-fourth of a period thereof. The periodic function value stored in the function ROM 2 can be read out by providing a value stored in the second register 7 which value has been operated by the address counter 1, to the function ROM 2 as an address.

A combination of an output transmitted from the function ROM 2 and a uppermost bit transmitted from the accumulator 5 as an encoded bit constitutes an output of the periodic function. Thus, it is possible to generate a periodic function by a period by virtue of a capacity of a function ROM, associated with one-fourth of a period of the function ROM.

A function transmitted from the function ROM 2 in the above-mentioned circuit would have a frequency F as defined below, under the following conditions.

Sampling frequency: fs
Address of the function ROM 2: p bits
Value stored in the first register: n
The frequency F is defined as follows.

$$F = n \times fs / 2^{(p+2)} \quad (A)$$

Thus, it would be possible to set the output frequency F to be equal to the sampling frequency fs multiplied by $n/2^{(p+2)}$, by varying the value n. In other words, the equation (A) indicates that even if an actual address of the function ROM 2 has p bits when a periodic function is to be generated, reading out the function ROM 2 is equivalent to reading out a function ROM having an address of (p+2) bits, and that a periodic function is generated by a period by virtue of a capacity of the function ROM 2, associated with one-fourth of a period of the function ROM 2.

Hereinbelow is analyzed storage of an amplitude of a periodic function into the function ROM 2 in the conventional circuit. In a first example, a sine wave function is selected as a periodic function. It is assumed that a minimum address in the function ROM 2 is defined as sin 0°, a maximum address in the function ROM 2 is defined as sin 90°, other addresses are defined as addresses obtained by equally dicretizing addresses ranging from the minimum address to the maximum, to thereby store a sine wave function having a quantized amplitude, into the function ROM 2.

Assuming that an address of the function ROM 2 has p bits, and that an address value of the function ROM 2 is equal to m defined as $0 \leq m \leq 2^P - 1$ where m is a positive integer, a sine wave function S associated with one-fourth of a period, to be stored in the function ROM 2 is defined as follows.

$$S = \sin(90° \times (m/(2^P - 1)))$$

If an amplitude is quantized in q bits, a maximum amplitude is defined as $(2^q - 1)$. Hence, a value V to be stored in the function ROM 2 is defined as follows.

$$V = (2^q - 1) \times \sin(90° \times (m/(2^P - 1)))$$

For instance, assuming that p is equal to two (p=2) and q is equal to five (q=5), since m is equal to 0, 1, 2 or 3, values of a sine wave function to be stored in the function ROM 2 are calculated as follows.

$m=0: 31 \times \sin 0° = 0$ $m=1: 31 \times \sin 30° \approx 16$ $m=2: 31 \times \sin 60° \approx 27$ $m=3: 31 \times \sin 90° = 31$ These calculation results are shown in FIG. 4A.

In the conventional circuit illustrated in FIG. 1, the control circuit 14 inverts an address to be input into the function ROM 2, or allows the address to pass therethrough without inverting. Hence, when a value of 1 is stored in the first register 3 (n=1), as shown in FIG. 4B, each of the maximum address (m=3) and the minimum address (m=0) in the function ROM 2 is successively twice read out. This causes a problem that a resultant periodic function includes distortion in a frequency plane.

Then, a second example is explained hereinbelow. The second example has an object to prevent the above-mentioned distortion in a frequency plane. Considering a turning point in addresses including a maximum address and a minimum address appearing subsequently to the maximum address in the function ROM 2, it is assumed that values of a sine wave function are to be stored into the function ROM 2 at a phase angle having an offset relative to a sampling clock by a half period of the sampling clock. Thus, zero cross points in a resultant sine wave are located at a center between sampling clocks between second and third quadrants and also between fourth and first quadrants. As a result, the above-mentioned distortion in a frequency plane would not be generated.

Assuming that an address of the function ROM 2 has p bits, and that an address value of the function ROM 2 is equal to m defined as $0 \leq m \leq 2^P - 1$ where m is a positive integer, since an offset phase angle associated with a half period of a sampling clock is defined as $(90°/2^P)/2$, a sine wave function S associated with one-fourth of a period, to be stored in the function ROM 2 is defined as follows.

$$S = \sin(90° \times ((2m+1)/2^{P+1}))$$

If an amplitude is quantized in q bits, a maximum amplitude is defined as $(2^q - 1)$. Hence, a value V to be stored in the function ROM 2 is defined as follows.

$$V = (2^q - 1) \times \sin(90° \times ((2m+1)/2^{P+1}))$$

For instance, assuming that p is equal to two (p=2) and q is equal to five (q=5), since m is equal to 0, 1, 2 or 3, and further since an offset phase angle associated with a half period of a sampling clock is equal to 11.25°, values of a sine wave function to be stored in the function ROM 2 are calculated as follows.

m=0: 31×sin 11.25°≈6 m=1: 31×sin 33.75°≈17 m=2: 31×sin 56.25°≈26 m=3: 31×sin 78.75°≈30

These calculation results are shown in FIG. 5A.

As shown in FIG. 5B, if the first register 3 stores a value of 1 (n=1) similarly to the first example, it would be possible to output a sine wave having no distortion in a frequency plane by storing the above-mentioned values into the function ROM 2.

However, an amplitude (which is equal to 30 in the second example) of the sine wave function to be stored in connection with a maximum address (m=3) of the function ROM 2 cannot avoid from being smaller than a desired maximum amplitude (which is equal to 31 in the second example) of a sine wave function by an offset phase angle. As a result, there is newly paused a problem that a resultant periodic function would include distortion in an amplitude plane.

In addition, since values of a sine wave function are stored into the function ROM 2 at a phase angle having an offset relative to a sampling clock by a half period of the sampling clock, zero cross points are never coincident with a sampling clock, resulting in that a phase difference would be generated between a resultant sine wave function and a sampling clock. Thus, the second example cannot be used for a system where a sine wave function is necessary to be coincident in phase with a sampling clock.

As discussed above, the conventional circuit for generating a periodic function is accompanied with problems of distortion in a frequency plane in a resultant periodic function, distortion in an amplitude plane or a phase difference between a resultant periodic function and a sampling clock.

SUMMARY OF THE INVENTION

It is an object of the present invention to provide a circuit capable of generating a periodic function without distortion in a frequency plane, distortion in an amplitude plane and a phase difference between a resultant periodic function and a sampling clock, and further without an increase in a capacity of a function ROM.

There is provided a circuit for digitally generating a series of encoded sampling values of a periodic function by virtue of ROM table conversion, including (a) a function ROM in which an amplitude associated with one-fourth of a period of a periodic function is stored, and (b) an address counter which generates an address signal to be input into the function ROM, the address counter including (b1) an accumulator, (b2) a first register which is externally controllable, (b3) an adder which adds an output transmitted from the accumulator to an output transmitted from the first register, and transmits the sum to the accumulator, (b4) an address-conversion circuit which receives a first output transmitted from the adder, and converts the first output into the address ignal, the first output being a bit output other than a second uppermost bit output among bit outputs transmitted from the adder, (b5) a second register which stores therein an output transmitted from the address-conversion circuit, and (b6) a zero-cross flag control circuit which receives an uppermost bit output transmitted from the accumulator, and makes logic control, an output transmitted from the second register being input into the function ROM as the address signal, the function ROM having the $(2^P + 1)$ number of address regions where P indicates the number of bits other than a second uppermost bit output among outputs transmitted from the adder, the series of encoded sampling values being defined as a sum of an output transmitted from the function ROM and an output transmitted from the zero-cross flag control circuit.

It is preferable that the address-conversion circuit receives a bit output other than a second uppermost bit output among bit outputs transmitted from the adder, and converts the bit output in accordance with the second uppermost bit output among bit outputs transmitted from the adder.

It is preferable that the address-conversion circuit includes (a) a first logic which inverts bit outputs bit by bit other than a second uppermost bit output among bit outputs transmitted from the adder, if a second uppermost bit output among bit outputs transmitted from the adder is equal to one, and allows bit outputs other than a second uppermost bit output among bit outputs transmitted from the adder, to pass therethrough as they are, if a second uppermost bit output among bit outputs transmitted from the adder is equal to zero, and (b) a second logic which adds an output transmitted from the first logic to a second uppermost bit output among bit outputs transmitted from the adder, at a lowermost bit.

It is preferable that the zero-cross flag control circuit includes a controller which receives an uppermost bit output transmitted from the accumulator, and makes logic control, based on judgement made by the second register for all bit outputs.

It is preferable that the zero-cross flag control circuit includes (a) a third logic which judges whether bit outputs transmitted from the second register are all equal to zero, and (b) a fourth logic which transmits an output indicative of zero regardless of an uppermost bit output transmitted from the accumulator, if all bit outputs transmitted from the second register are equal to zero, and allows an uppermost bit output transmitted from the accumulator, to pass therethrough as it is, if all bit outputs transmitted from the second register are not equal to zero.

It is preferable that the amplitude is stored in the function ROM on the assumption that a minimum address in the address regions of the function ROM corresponds to a phase angle of 0 degree in a periodic function having a period consisting of a phase angle of 360 degrees, a maximum address in the address regions of the function ROM corresponds to a phase angle of 90 degrees in the periodic function, and each of addresses intermediate between the minimum and maximum addresses corresponds to a phase angle obtained by equally discretizing phase angles ranging from the minimum phase angle to the maximum phase angle.

The above-mentioned periodic function includes a sine wave function, a function having a waveform a period of which is in point symmetry and a half period of which is in line symmetry, and a function having a waveform a period of which is in line symmetry and a half period of which is in point symmetry.

There is further provided a circuit for digitally generating a series of encoded sampling values of a periodic function by virtue of ROM table conversion, including (a) a function ROM in which an amplitude associated with one-fourth of a period of a periodic function is stored, and (b) an address counter which generates an address signal to be input into the function ROM, the address counter including (b1) an accumulator, (b2) a first register which is externally controllable, (b3) an adder which adds an output transmitted from the accumulator to an output transmitted from the first register, and transmits the sum to the accumulator, (b4) an address-conversion circuit which receives a first output transmitted from the accumulator, and converts the first output into the address signal, the first output being a bit output other than a second uppermost bit output among bit outputs transmitted from the accumulator, (b5) a second register which stores therein an output transmitted from the address-conversion circuit, (b6) a third register which stores therein an uppermost bit output transmitted from the accumulator, and (b7) a zero-cross flag control circuit which receives an output transmitted from the third register, and makes logic control, an output transmitted from the second register being input into the function ROM as the address signal, the function ROM having the $(2^P+1)$ number of address regions where P indicates the number of bits other than a second uppermost bit output among outputs transmitted from the accumulator, the series of encoded sampling values being defined as a sum of an output transmitted from the function ROM and an output transmitted from the zero-cross flag control circuit.

It is preferable that the address-conversion circuit receives a bit output other than a second uppermost bit output among bit outputs transmitted from the accumulator, and converts the bit output in accordance with a second uppermost bit output among bit outputs transmitted from the accumulator.

It is preferable that the address-conversion circuit includes (a) a first logic which inverts bit outputs bit by bit other than a second uppermost bit output among bit outputs transmitted from the accumulator, if a second uppermost bit output among bit outputs transmitted from the accumulator is equal to one, and allows bit outputs other than a second uppermost bit output among bit outputs transmitted from the accumulator, to pass therethrough as they are, if a second uppermost bit output among bit outputs transmitted from the accumulator is equal to zero, and (b) a second logic which adds an output transmitted from the first logic to a second uppermost bit output among bit outputs transmitted from the accumulator, at a lowermost bit.

It is preferable that the zero-cross flag control circuit includes a controller which receives an output transmitted from the third register, and makes logic control, based on judgement made by the second register for all bit outputs.

It is preferable that the zero-cross flag control circuit includes (a) a third logic which judges whether bit outputs transmitted from the second register are all equal to zero, and (b) a fourth logic which transmits an output indicative of zero regardless of an output transmitted from the third register, if all bit outputs transmitted from the second register are equal to zero, and allows an output transmitted from the third register, to pass therethrough as it is, if all bit outputs transmitted from the second register are not equal to zero.

It is preferable that the amplitude is stored in the function ROM on the assumption that a minimum address in the address regions of the function ROM corresponds to a phase angle of 0 degree in a periodic function having a period consisting of a phase angle of 360 degrees, a maximum address in the address regions of the function ROM corresponds to a phase angle of 90 degrees in the periodic function, and each of addresses intermediate between the minimum and maximum addresses corresponds to a phase angle obtained by equally discretizing phase angles ranging from the minimum phase angle to the maximum phase angle.

The advantages obtained by the aforementioned present invention will be described hereinbelow.

As mentioned earlier, the circuit in accordance with the present invention is designed to include the address-conversion circuit and the zero-cross flag control circuit in place of the control circuit for inverting a bit, in the conventional circuit for generating a periodic function, to thereby optimize storage of an amplitude into the function ROM. As a result, even though the circuit includes a function ROM capacity associated with one-fourth of a period which capacity is almost the same as that of the conventional circuit, it is possible to generate a periodic function including no distortion in a frequency plane, no distortion in an amplitude plane and no phase difference between a resultant periodic function and a sampling clock.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 2 is a table showing an operation of the circuit illustrated in FIG. 1.

FIG. 9 is a table showing an operation of the circuit in accordance with the first embodiment.

DESCRIPTION OF THE PREFERRED EMBODIMENTS

Preferred embodiments in accordance with the present invention will be explained hereinbelow with reference to drawings.

Figure 6:
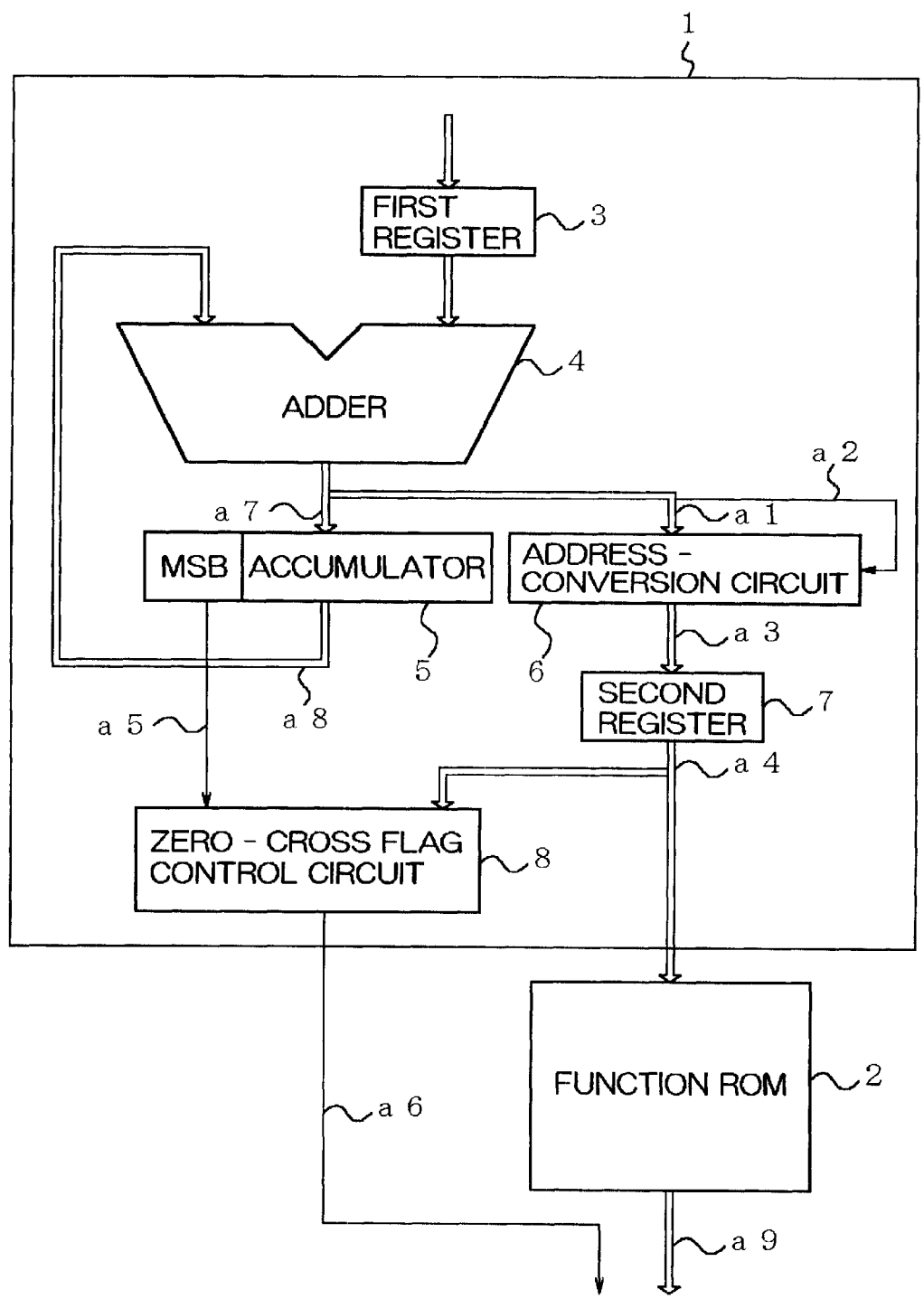
FIG. 6 is a block diagram of a circuit for generating a periodic function, in accordance with the first embodiment of the present invention.

FIG. 6 illustrates a circuit for generating a periodic function, in accordance with the first embodiment.

As illustrated in FIG. 6, the circuit is comprised of an address counter 1 and a function ROM 2 storing therein an amplitude of a resultant periodic function. The address counter 1 is comprised of a first register 3 into which a value can be externally input, an adder 4, an accumulator 5, a circuit 6 for converting an address, a second register 7, and a zero-cross flag control circuit 8.

The adder 4 adds an output signal transmitted from the first register 3 to an output signal a8 transmitted from the accumulator 5, and transmits a signal a7 indicative of the sum, to the accumulator 5. The accumulator 5 latches the received signal a7 by a sampling clock at a sampling period.

The address-conversion circuit 6 receives a signal a1 which is a signal other than a second uppermost bit output among the output signals a7 transmitted from the adder 4, and converts the signal a1 into a signal a3 having bits greater in number than bits of the signal a1 by one, in accordance with a signal a2 which is a second uppermost bit output among the output signals a7 transmitted from the adder 4. The thus converted signal a3 is transmitted to the second register 7.

The second register 7 latches the signal a3 by a sampling clock at a sampling period, and transmits an output signal a4 to both the function ROM 2 and the zero-cross flag control circuit 8.

The zero-cross flag control circuit 8 receives a signal a5 which is an uppermost bit output (MSB) transmitted from the accumulator 5, and controls a logic of the received signal a5 in accordance with the output signal a4 transmitted from the second register 7.

The function ROM 2 stores an amplitude associated with one-fourth of a period of a periodic function, in each of addresses. An amplitude associated with each of addresses can be read out by transmitting the output signal a4 to the function ROM 2 from the second register 7 which output signal a4 is an address signal operated by the address counter 1.

A combination of an output signal a9 transmitted from the function ROM 2 and an output signal a6 transmitted from the zero-cross flag control circuit 8 as an encoded bit constitutes a series of encoded sampling values in a period of the periodic function.

Hereinbelow is explained an operation of the circuit for generating a periodic function, in accordance with the first embodiment, with reference to FIGS. 7A, 7B, 8 and 9.

With reference to FIG. 6, if it is assumed that the output signal a7 transmitted from the adder 4 and the output signal a8 transmitted from the accumulator 5 are both 4-bit signals, the signal a1 is a 2-bit signal, the signals a2, a5 and a6 are 1-bit signals, the signals a3 and a4 are 3-bit signals, and the signal a9 is a 5-bit signal if an amplitude thereof is quantized in five bits. Herein, the number of bits of the signals a3 and a4 is equal to the number of bits of the signal a7 from which two (2) is subtracted and to which one (1) is added.

It is assumed that a sine wave function is to be generated as a periodic function, and that an amplitude associated with sin 90° is stored in a maximum address among $(2^P+1)$ number of address regions where P indicates the number of bits other than a second uppermost bit output among output bits transmitted from the adder 4, and amplitudes quantized in accordance with a series of sampling values obtained by equally discretizing phase angles ranging from 0 degree to 90 degrees are stored in other addresses. Hence, the number of bits of the signal a4 acting as an address signal to be input into the function ROM 2 has to be equal to the number of bits of the output signal a7 from which two (2) is subtracted and to which one (1) is added. Since the signal a3 is input into the second register 7 and is output from the second register 7 as the output signal a4, the signals a3 and a4 have the same number of bits.

Assuming that an address of the function ROM 2 has p bits, and that an address value of the function ROM 2 is equal to m defined as $0 \leq m \leq 2^P-1$ where m is a positive integer, a sine wave function S associated with one-fourth of a period, to be stored in the function ROM 2 is defined as follows.

$$S=\sin(90°\times(m/(2^{P-1})))$$

If an amplitude is quantized in q bits, a maximum amplitude is defined as $(2^q-1)$. Hence, a value V to be stored in the function ROM 2 is defined as follows.

$$V=(2^q-1)\times\sin(90°\times(m/(2^{P-1})))$$

Since the output signal a7 transmitted from the adder 4 has 4 bits, the address signal to be input into the function ROM 2 has 3 bits. Assuming that an amplitude is quantized in 5 bits, and that p is equal to three (p=3), q is equal to five (q=5), and m is equal to 1, 2, 3 or 4, amplitudes to be stored in addresses 0 to 4 are defined as follows.

Address 0($m$=0):31×sin 0°=0

Address 1($m$=1):31×sin 22.5°≈8

Address 2($m$=2):31×sin 45°≈16

Address 3($m$=3):31×sin 67.5°≈23

Address 4($m$=4):31×sin 90°=31

Figure 7A:
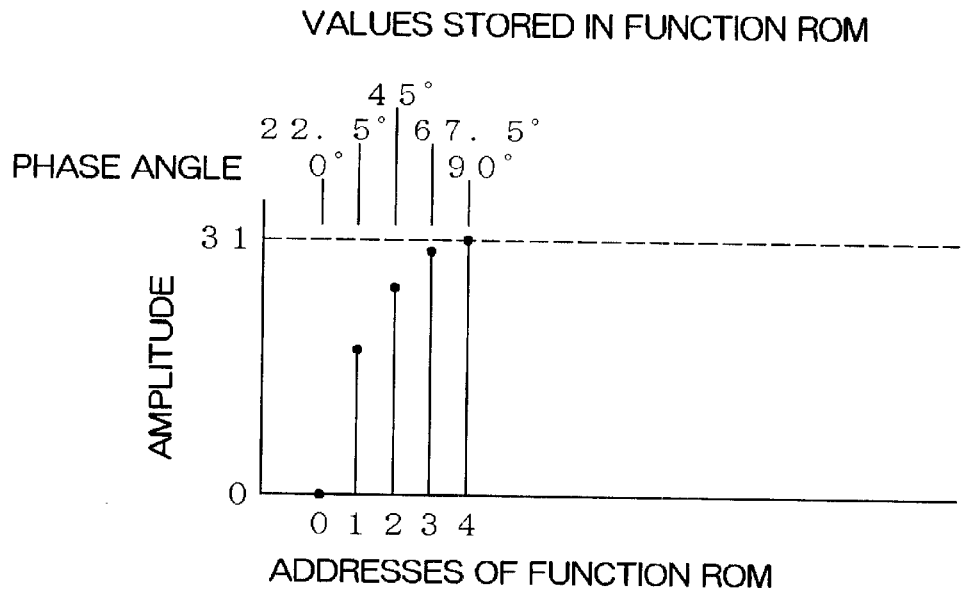
FIG. 7A is a graph showing a relation between addresses of a function ROM and amplitudes to be stored in the function ROM, found when a sine wave function is to be stored in the function ROM in the circuit in accordance with the first embodiment.

These calculation results are shown in FIG. 7A. FIG. 7A illustrates amplitudes in one-fourth of a period in the first quadrant in a sine wave function to be stored in addresses 0 to 4 of the function ROM 2.

FIG. 9 shows an internal operation of the circuit illustrated in FIG. 6 in the case that a value of 1 is stored in the first register 3.

Herein, it is assumed that values stored in the accumulator 5 is initially reset for simplification of explanation. In the circuit in accordance with the first embodiment, when the second uppermost bit output signal a2 is equal to one among the output signals a7 transmitted from the adder 4, the output signals a1 other than the second uppermost bit output signal among the output signals a7 are inverted in each of bits and output. When the output signal a2 is equal to zero, the output signals a1 are allowed to pass through the address-conversion circuit 6 without being inverted, and in addition, the output signals a1 and the output signal a2 are added to each other at a lowermost bit in the address-conversion circuit 6, and then, output from the address-conversion circuit 6.

When the zero-cross flag control circuit 8 judges that the output signal a4 transmitted from the second register 7 has 3 bits (000) by which sin 0° of the function ROM 2, that is, zero-cross points of the sine wave function, can be read out, the zero-cross flag control circuit 8 transmits a zero signal regardless of the signal a5 transmitted from the accumulator 5. When the zero-cross flag control circuit 8 judges that the output signal a4 does not have 3 bits (000), the zero-cross flag control circuit 8 allows the signal a5 to pass therethrough as the output signal a6 which acts as an encoded bit for the output signal a9 transmitted from the function ROM 2.

Figure 8:
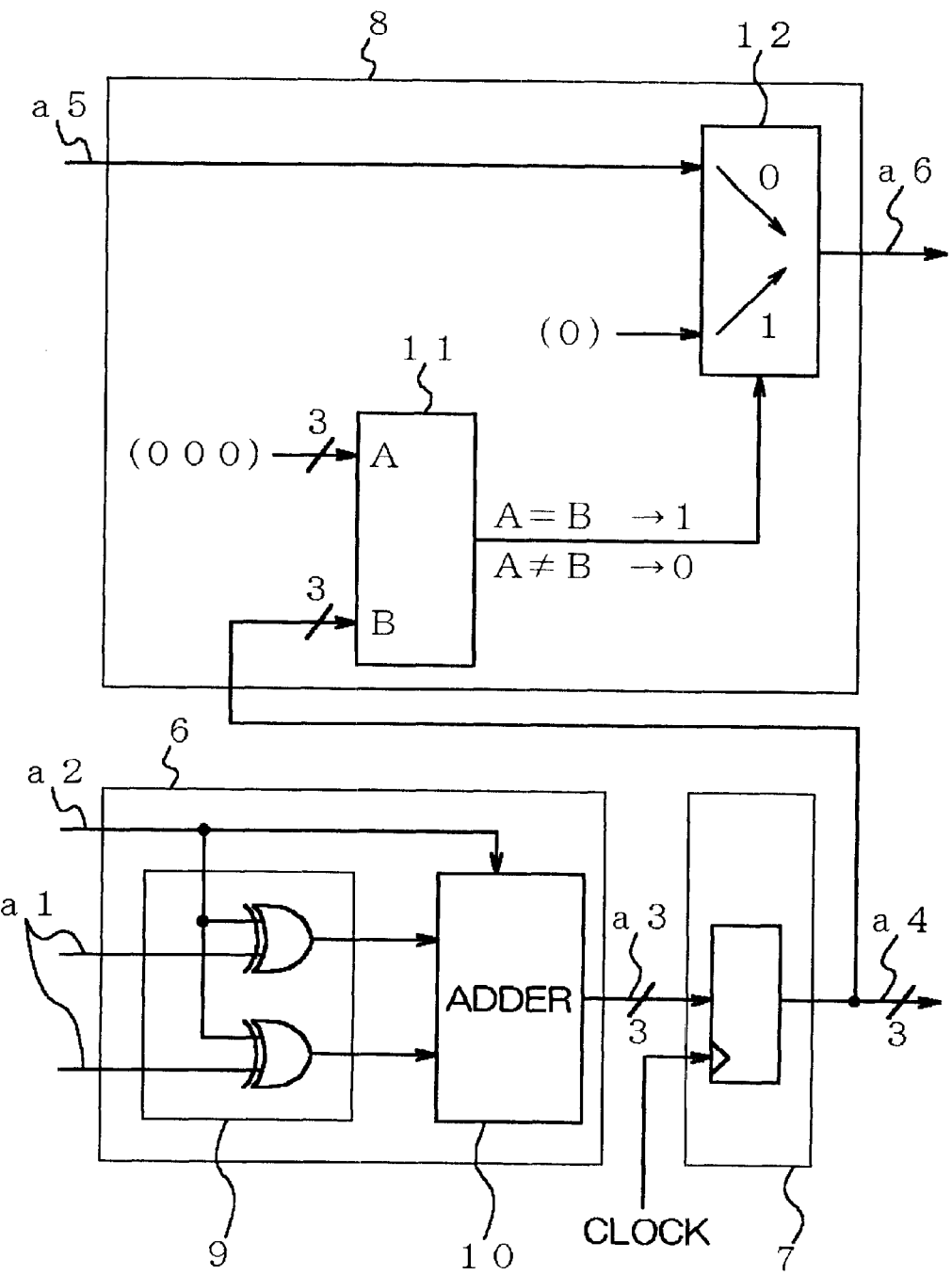
FIG. 8 is a block diagram of the address-conversion circuit and the zero-cross flag control circuit both of which are parts of the circuit in accordance with the first embodiment.

FIG. 8 is a block diagram illustrating structures of the address-conversion circuit 6 and the zero-cross flag control circuit 8. The address-conversion circuit 6 is comprised of an exclusive OR operation device 9 and an adder 10. The zero-cross flag control circuit 8 is comprised of a comparator 11 and a zero-cross flag switch 12.

Figure 1:
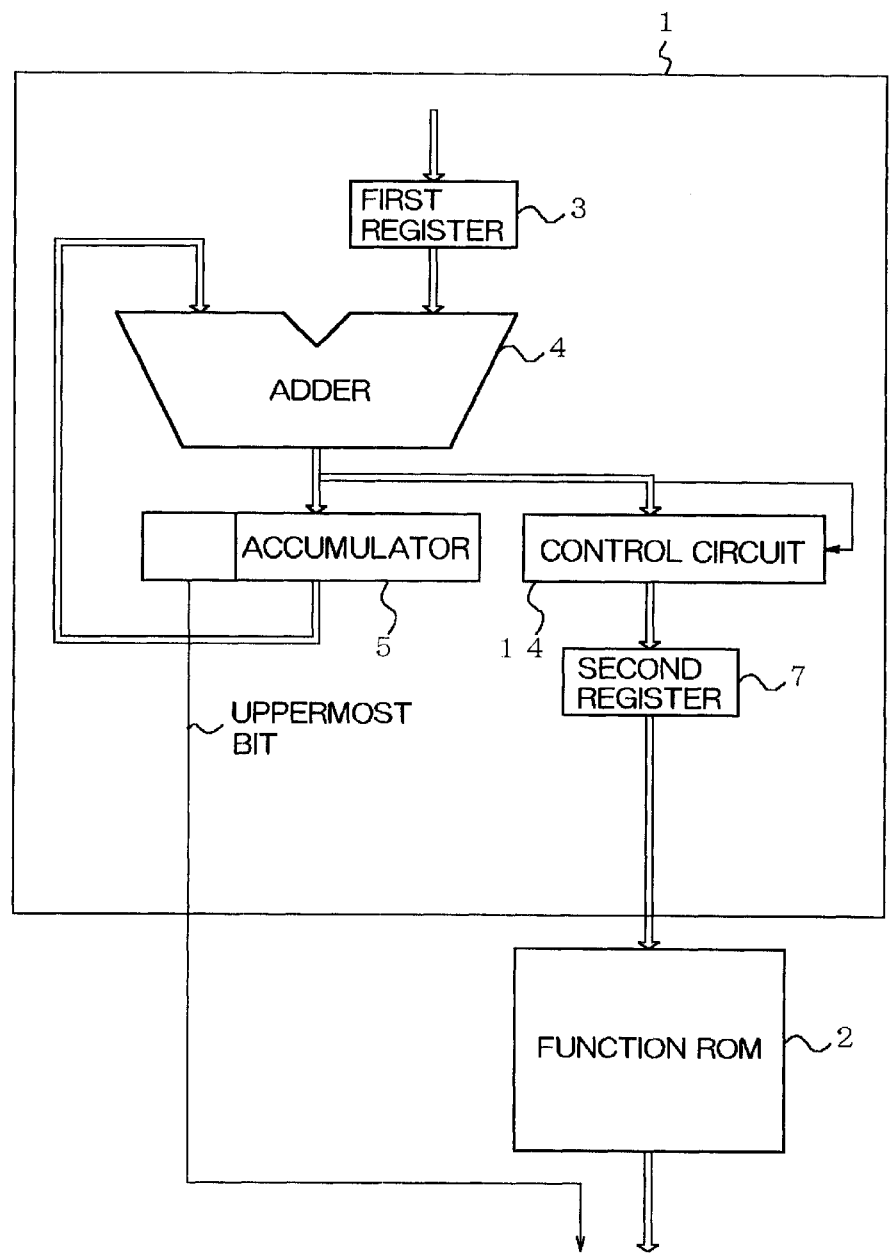
FIG. 1 is a block diagram of a conventional circuit for generating a periodic function.
Figure 3A:
FIG. 3A is a graph showing a relation between addresses of the function ROM and amplitudes to be stored in the function ROM, found when a sine wave function is to be stored in the function ROM in the circuit illustrated in FIG. 1.
Figure 3B:
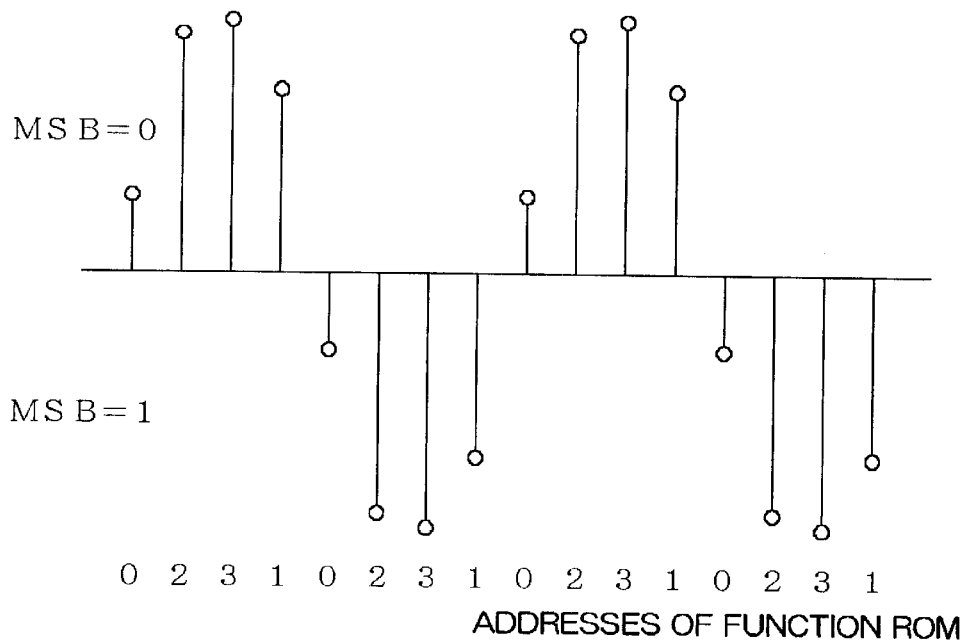
FIG. 3B shows waveforms of outputs transmitted from a function ROM in the case that a numeral of 2 is stored in the first register (n=2) in the circuit illustrated in FIG. 1.

In the address-conversion circuit 6, the exclusive OR operation device 9 inverts the signal a1 in each of bits, and the adder 10 adds one (1) to a lowermost bit output in outputs transmitted from the exclusive OR operation device 9. To add one (1) to a lowermost bit output in outputs transmitted from the exclusive OR operation device 9 is conducted by the adder 10 not by actually adding a FIG. 1 to the lowermost bit output, but by directly adding the output signal a2 to the lowermost bit output.

An output signal a3 transmitted from the adder 10 has 3 bits greater than the bits of the signal a1 by one bit, and is latched by the second register 7 at a timing of a sampling clock. As a result, the output signal a3 is converted into a signal a4 having 3 bits, which is input into the comparator 11 in the zero-cross flag control circuit 8.

The zero-cross flag control circuit 8 stores a 3-bit value (000) therein as a reference value. When the received signal a4 is coincident with the reference value, the comparator 11 transmits a signal indicative of one (1), whereas when the received signal a4 is not coincident with the reference value, the comparator 11 transmits a signal indicative of zero (0). Thus, the comparator 11 detects a 3-bit value (000) in the address signal a4, which value is associated with a zero-cross point in a sine wave function.

In accordance with an output transmitted from the comparator 11, the zero-cross flag switch 12 is switched. Specifically, when the zero-cross flag switch 12 receives a signal indicative of zero from the comparator 11, the zero-cross flag switch 12 allows the signal a5 to pass therethrough without being inverted, whereas when the zero-cross flag switch 12 receives a signal indicative of one from the comparator 11, the zero-cross flag switch 12 transmits a signal indicative of zero. Thus, the zero-cross flag switch 12 transmits a 1-bit signal a6. The signal a6 acts as an encoded bit where 0 indicates a positive value and 1 indicates a negative value.

Figure 4A:
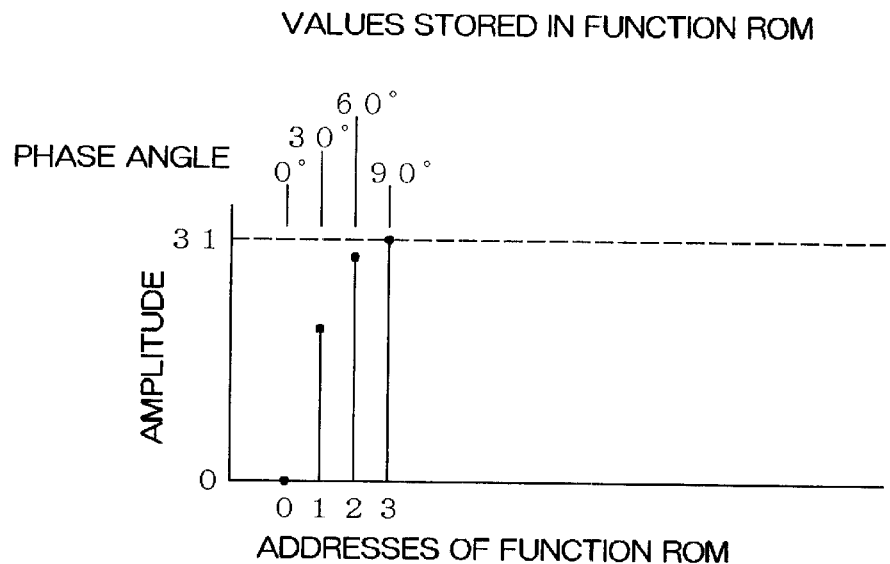
FIG. 4A is a graph showing a relation between addresses of a function ROM and amplitudes to be stored in the function ROM, found when a sine wave function is to be stored in the function ROM in the circuit in accordance with the first example.
Figure 4B:
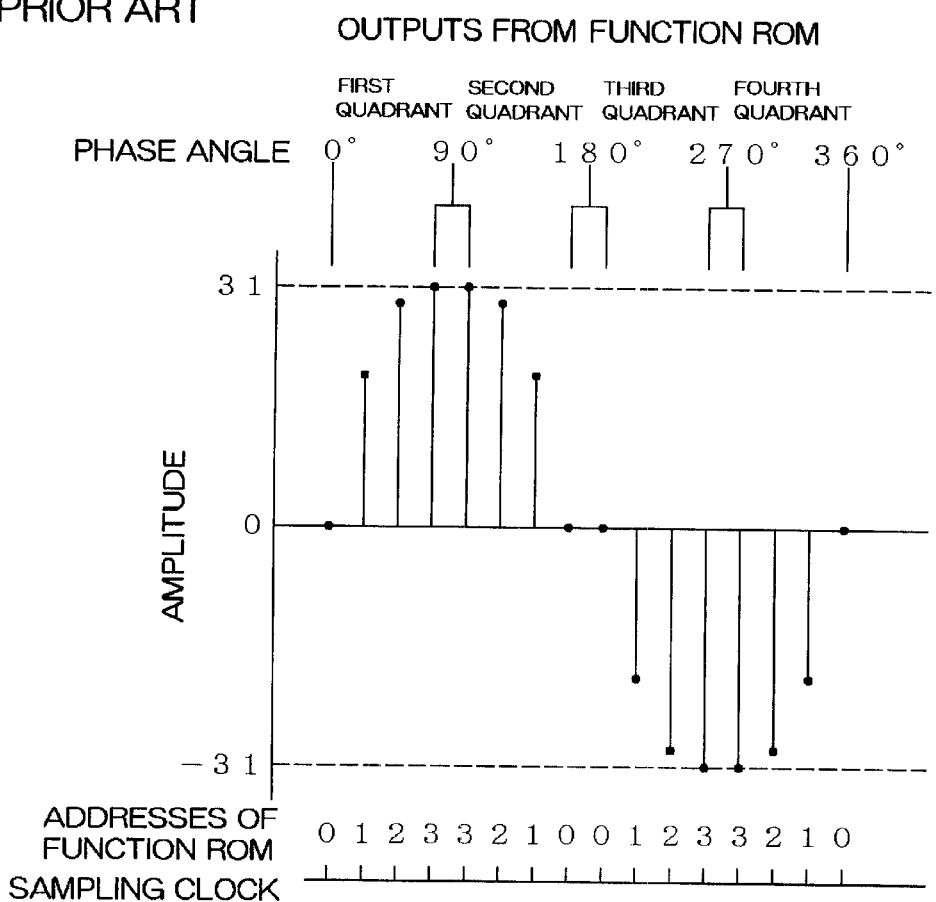
FIG. 4B shows waveforms of outputs transmitted from a function ROM in the case that a numeral of 1 is stored in the first register (n=1) in the circuit in accordance with the first example.
Figure 5A:
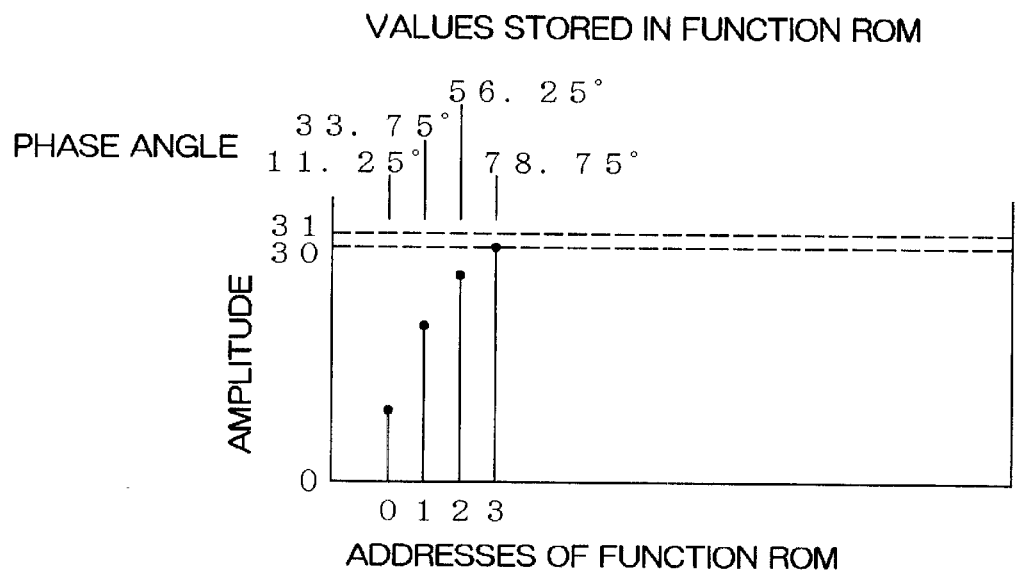
FIG. 5A is a graph showing a relation between addresses of a function ROM and amplitudes to be stored in the function ROM, found when a sine wave function is to be stored in the function ROM in the circuit in accordance with the second example.
Figure 5B:
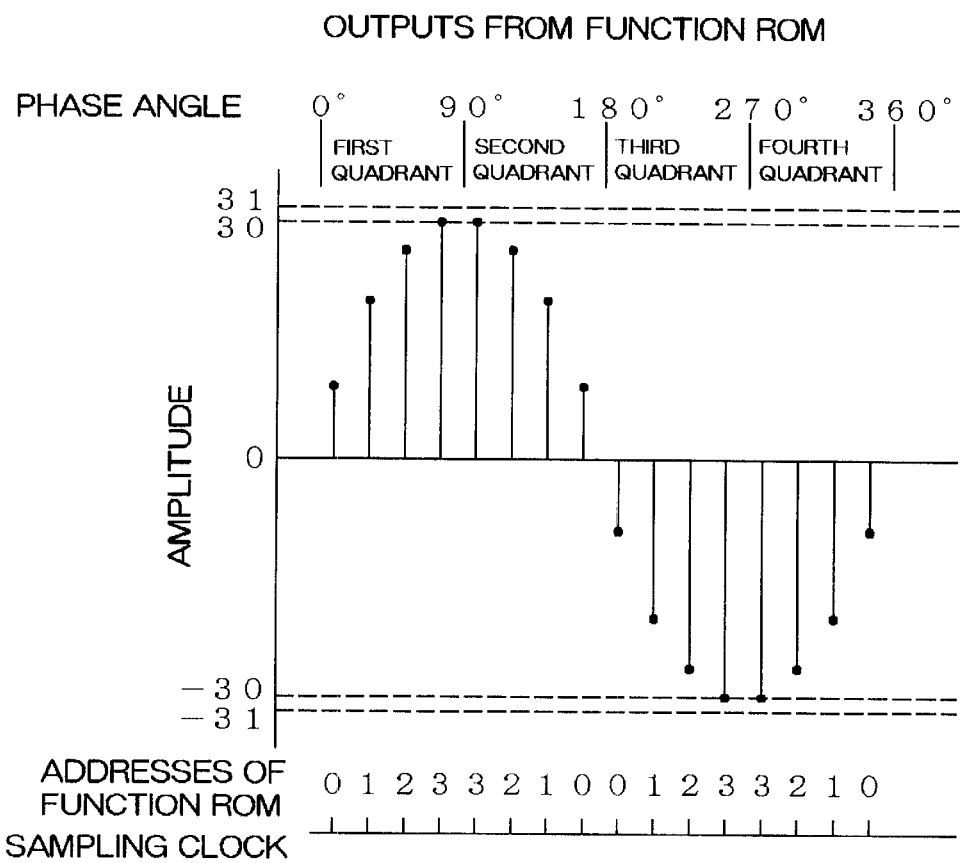
FIG. 5B shows waveforms of outputs transmitted from a function ROM in the case that a numeral of 1 is stored in the first register (n=1) in the circuit in accordance with the second example.

As having been explained so far, the signals a4 as shown in FIG. 4 are read out as addresses to be input into the function ROM 2, and combined with the signals a6, thereby the sine wave output illustrated in FIG. 7A can be obtained.

Figure 7B:
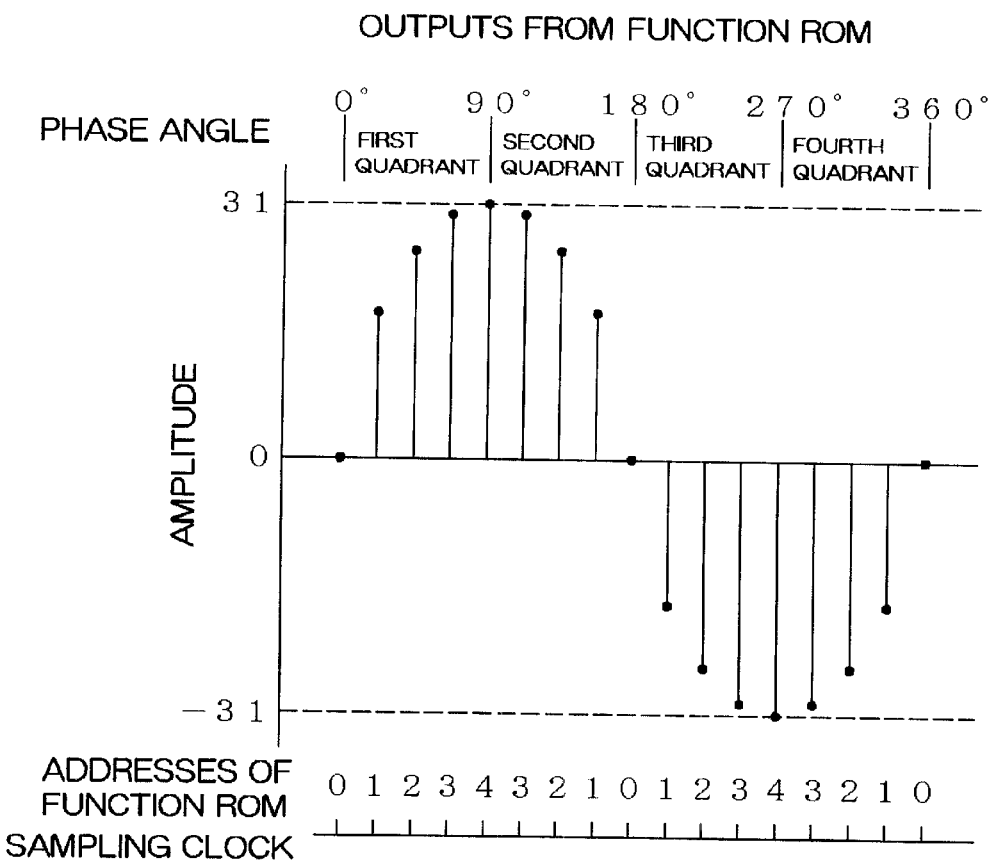
FIG. 7B shows waveforms of outputs transmitted from a function ROM in the case that a numeral of 1 is stored in the first register (n=1) in the circuit in accordance with the first embodiment.

A waveform of the sine wave output illustrated in FIG. 7B is characterized in that sampling clocks are coincident with zero-cross points of a sine wave, and that positive and negative maximum amplitudes can be obtained at maximum addresses of the function ROM 2.

The output transmitted from the function ROM 2 in the above-mentioned circuit would have a frequency F as defined below, under the following conditions.

Sampling frequency: fs

Address of the function ROM 2: p bits

Address values of the function ROM 2: m ($0 \leq m \leq 2^{P-1}$ where m indicates a positive integer)

Value stored in the first register 3: n The frequency F is defined as follows.

$$F=n\times fs/2^{(p+1)} \qquad (B)$$

Thus, it would be possible to set the output frequency F to be equal to the sampling frequency fs multiplied by $n/2^{(p+1)}$, by varying the value n. In other words, the equation (B) indicates that though only a periodic function having a one-fourth period is stored in the function ROM 2 having the $(2^{P-1}+1)$ number of addresses, namely, address 0 to address $2^{P-1}$, reading out the function ROM 2 is equivalent to reading out a function ROM in which a periodic function having a period is stored in the $2^{P+1}$ number of addresses. This advantage is brought by the address-conversion circuit 6 and the zero-cross flag control circuit 8.

Comparing the equation (B) to the earlier mentioned equation (A), the equations (B) and (A) are equivalent to each other, because the number of address bits of the function ROM 2 is greater than by one bit that of the conventional one. Though the number of address bits in the first embodiment is greater by one than the conventional one, since the number of address regions in the function ROM 2 is equal to $(2^{(p-1)}+1)$, the address regions in the first embodiment are greater in number than the address regions in the conventional circuit only by one. Accordingly, in accordance with the first embodiment, it is possible to generate a periodic function having a period with a capacity of the function ROM 2 being almost the same as that in the conventional circuit.

As mentioned earlier, the circuit in accordance with the first embodiment is designed to include the address-conversion circuit 6 and the zero-cross flag control circuit 8 in place of the control circuit 14 for inverting a bit, which is a part of the conventional circuit for generating a periodic function, to thereby optimize storage of an amplitude into the function ROM 2. As a result, the circuit in accordance with the first embodiment provides the following advantages.

The first advantage is that it is not necessary to increase a capacity of a function ROM having a one-fourth period relative to the same in the conventional circuit. This advantage is brought by the structure where the number of address regions in the function ROM 2 is greater only by one than the same in a function ROM in the conventional circuit.

The second advantage is that no distortion is ensured in an amplitude plane. This advantage is brought by both the address-conversion circuit 6 and the zero-cross flag control circuit 8 both of which control addresses of the function ROM 2 such that function values at both zero-cross points and a maximum amplitude are flattened without distortion.

The third advantage is that no distortion in a frequency plane and no phase difference between a resultant periodic function and a sampling clock are ensured. This advantage is brought by the structure in which maximum and minimum amplitudes of a resultant periodic function are stored in the function ROM 2.

Though a sine wave function has been selected as a periodic function in the above-mentioned first embodiment, there may be selected a periodic function in which a period of a waveform is in point symmetry and a half period of a waveform is in line symmetry, or a periodic function in which a period of a waveform is in line symmetry and a half period of a waveform is in point symmetry. The present invention can be applied to such periodic functions by adjusting zero-cross points in the zero-cross flag control circuit 8.

Figure 10:
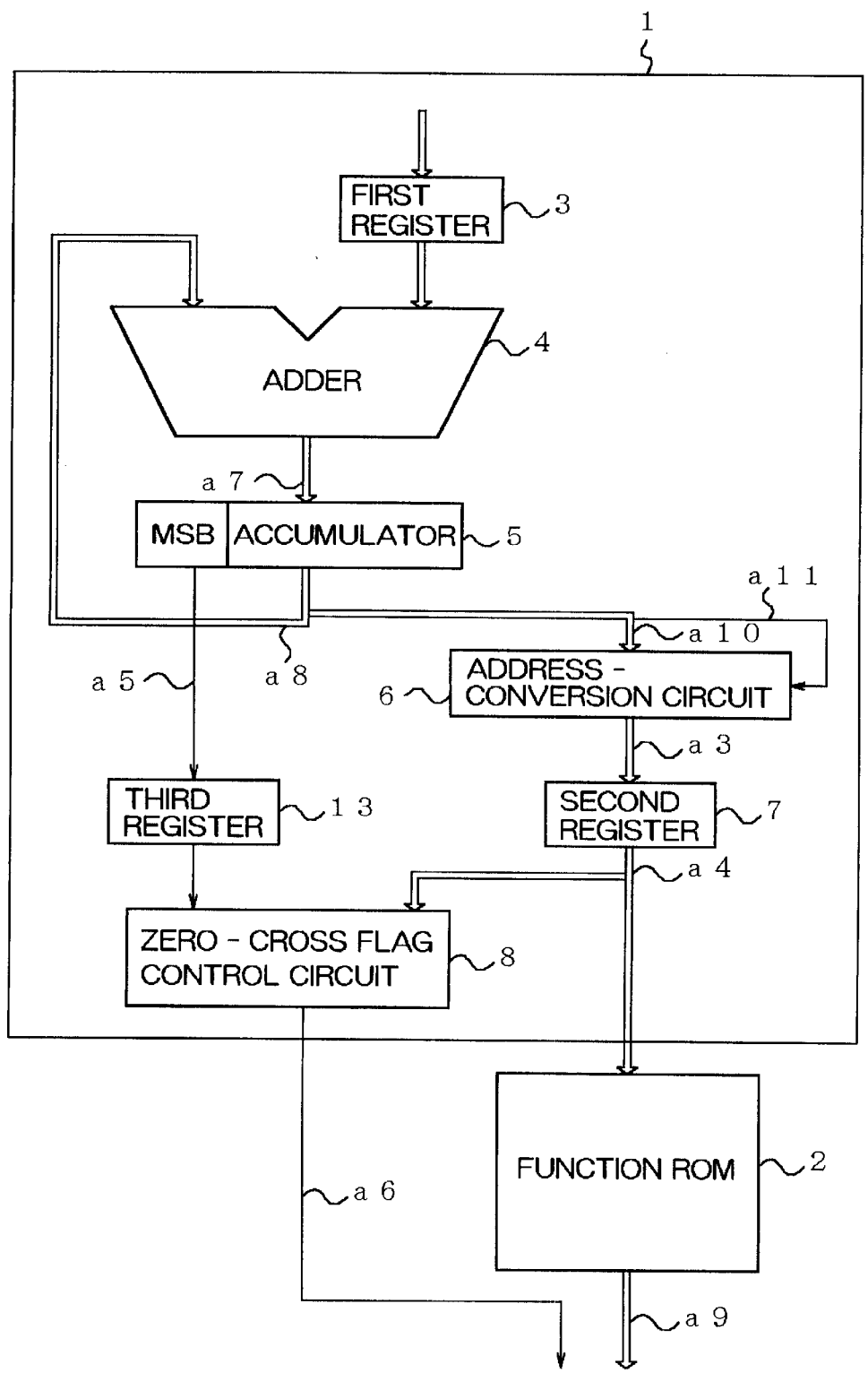
FIG. 10 is a block diagram of a circuit for generating a periodic function, in accordance with the second embodiment of the present invention.

FIG. 10 illustrates a circuit for generating a periodic function, in accordance with the second embodiment.

As illustrated in FIG. 10, the circuit is comprised of an address counter 1 and a function ROM 2 storing therein an amplitude of a resultant periodic function. The address counter 1 is comprised of a first register 3 into which a value can be externally input, an adder 4, an accumulator 5, a circuit 6 for converting an address, a second register 7, a zero-cross flag control circuit 8, and a third register 13.

In the above-mentioned first embodiment, the signals a1 and a2 which are both parts of the output signals a7 transmitted from the adder 4 are input into the address-conversion circuit 6. In the second embodiment, signals a10 other than a second uppermost bit output among the output signals a8 transmitted from the accumulator 5 which output signals a8 are delayed by a sampling clock, are input into the address-conversion circuit 6 in place of the signal a1, and a second uppermost bit output signal a11 among the output signals a8 is input into the address-conversion circuit 6 in place of the signal a2.

The third register 13 receives an uppermost bit output signal (MSB) a5 transmitted from the accumulator 5, latches the thus received signal a5 at a timing of a sampling clock, and transmits an output to the zero-cross flag control circuit 8. The third register 13 compensates for delay to a degree of a sampling clock which delay is generated in a path in which addresses to be input into the function ROM 2 are generated.

An operation for generating a periodic function in the circuit in accordance with the second embodiment is the same as that of the circuit in accordance with the first embodiment except an operation of the third register 13.

The reason why the address-conversion circuit 6 receives output signals transmitted from the accumulator 5 is as follows.

If an accuracy of a resultant periodic function is to be enhanced, it would be unavoidable for a function ROM to have an increased capacity, which would in turn cause the number of address bits in the function ROM 2, and accordingly, the number of bits in the adder 4, the accumulator 5 and the address-conversion circuit 6 to increase. This results in an increase in operation volume.

If the address-conversion circuit 6 is designed to directly receive outputs transmitted from the adder 4 as shown in the first embodiment, an operation might not be finished within a period of one sampling clock, because of increased operation volume. The circuit in accordance with the second embodiment solves this problem. Though total delay is increased, the circuit in accordance with the second embodiment provides a periodic function having high accuracy for an operation.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-16960 filed on Jan. 26, 1999 including specification, claims, drawings and summary is incorporated herein by reference in its entirety.

What is claimed is:

1. A circuit for digitally generating a series of encoded sampling values of a periodic function by virtue of ROM table conversion, comprising:

(a) a function ROM in which an amplitude associated with one-fourth of a period of a periodic function is stored; and (b) an address counter which generates an address signal to be input into said function ROM, said address counter comprising:

(b1) an accumulator;

(b2) a first register which is externally controllable;

(b3) an adder which adds an output transmitted from said accumulator to an output transmitted from said first register, and transmits the sum to said accumulator;

(b4) an address-conversion circuit which receives a first output transmitted from said adder, and converts said first output into said address signal, said first output being a bit output other than a second uppermost bit output among bit outputs transmitted from said adder;

(b5) a second register which stores therein an output transmitted from said address-conversion circuit; and (b6) a zero-cross flag control circuit which receives an uppermost bit output transmitted from said accumulator, and makes logic control, an output transmitted from said second register being input into said function ROM as said address signal, said function ROM having the ($2^P+1$) number of address regions where P indicates the number of bits other than a second uppermost bit output among outputs transmitted from said adder, said series of encoded sampling values being defined as a sum of an output transmitted from said function ROM and an output transmitted from said zero-cross flag control circuit.

2. The circuit as set forth in claim 1, wherein said address-conversion circuit receives a bit output other than a second uppermost bit output among bit outputs transmitted from said adder, and converts said bit output in accordance with the second uppermost bit output among bit outputs transmitted from said adder.

3. The circuit as set forth in claim 1, wherein said address-conversion circuit includes:

(a) a first logic which inverts bit outputs bit by bit other than a second uppermost bit output among bit outputs transmitted from said adder, if a second uppermost bit output among bit outputs transmitted from said adder is equal to one, and allows bit outputs other than a second uppermost bit output among bit outputs transmitted from said adder, to pass therethrough as they are, if a second uppermost bit output among bit outputs transmitted from said adder is equal to zero; and (b) a second logic which adds an output transmitted from said first logic to a second uppermost bit output among bit outputs transmitted from said adder, at a lowermost bit.

4. The circuit as set forth in claim 1, wherein said zero-cross flag control circuit includes a controller which receives an uppermost bit output transmitted from said accumulator, and makes logic control, based on judgement made by said second register for all bit outputs.

5. The circuit as set forth in claim 1, wherein said zero-cross flag control circuit includes:

(a) a third logic which judges whether bit outputs transmitted from said second register are all equal to zero; and (b) a fourth logic which transmits an output indicative of zero regardless of an uppermost bit output transmitted from said accumulator, if all bit outputs transmitted from said second register are equal to zero, and allows an uppermost bit output transmitted from said accumulator, to pass therethrough as it is, if all bit outputs transmitted from said second register are not equal to zero.

6. The circuit as set forth in claim 1, wherein said amplitude is stored in said function ROM on the assumption that a minimum address in said address regions of said function ROM corresponds to a phase angle of 0 degree in a periodic function having a period consisting of a phase angle of 360 degrees, a maximum address in said address regions of said function ROM corresponds to a phase angle of 90 degrees in said periodic function, and each of addresses intermediate between said minimum and maximum addresses corresponds to a phase angle obtained by equally discretizing phase angles ranging from said minimum phase angle to said maximum phase angle.

7. The circuit as set forth in claim 1, wherein said periodic function is a sine wave function.

8. The circuit as set forth in claim 1, wherein said periodic function have a waveform a period of which is in point symmetry and a half period of which is in line symmetry.

9. The circuit as set forth in claim 1, wherein said periodic function have a waveform a period of which is in line symmetry and a half period of which is in point symmetry.

10. A circuit for digitally generating a series of encoded sampling values of a periodic function by virtue of ROM table conversion, comprising:

(a) a function ROM in which an amplitude associated with one-fourth of a period of a periodic function is stored; and (b) an address counter which generates an address signal to be input into said function ROM, said address counter comprising:

(b1) an accumulator;

(b2) a first register which is externally controllable;

(b3) an adder which adds an output transmitted from said accumulator to an output transmitted from said first register, and transmits the sum to said accumulator;

(b4) an address-conversion circuit which receives a first output transmitted from said accumulator, and converts said first output into said address signal, said first output being a bit output other than a second uppermost bit output among bit outputs transmitted from said accumulator;

(b5) a second register which stores therein an output transmitted from said address-conversion circuit;

(b6) a third register which stores therein an uppermost bit output transmitted from said accumulator; and (b7) a zero-cross flag control circuit which receives an output transmitted from said third register, and makes logic control, an output transmitted from said second register being input into said function ROM as said address signal, said function ROM having the ($2^P+1$) number of address regions where P indicates the number of bits other than a second uppermost bit output among outputs transmitted from said accumulator, said series of encoded sampling values being defined as a sum of an output transmitted from said function ROM and an output transmitted from said zero-cross flag control circuit.

11. The circuit as set forth in claim 10, wherein said address-conversion circuit receives a bit output other than a second uppermost bit output among bit outputs transmitted from said accumulator, and converts said bit output in accordance with a second uppermost bit output among bit outputs transmitted from said accumulator.

12. The circuit as set forth in claim 10, wherein said address-conversion circuit includes:

(a) a first logic which inverts bit outputs bit by bit other than a second uppermost bit output among bit outputs transmitted from said accumulator, if a second uppermost bit output among bit outputs transmitted from said accumulator is equal to one, and allows bit outputs other than a second uppermost bit output among bit outputs transmitted from said accumulator, to pass therethrough as they are, if a second uppermost bit output among bit outputs transmitted from said accumulator is equal to zero; and (b) a second logic which adds an output transmitted from said first logic to a second uppermost bit output among bit outputs transmitted from said accumulator, at a lowermost bit.

13. The circuit as set forth in claim 10, wherein said zero-cross flag control circuit includes a controller which receives an output transmitted from said third register, and makes logic control, based on judgement made by said second register for all bit outputs.

14. The circuit as set forth in claim 10, wherein said zero-cross flag control circuit includes:
   (a) a third logic which judges whether bit outputs transmitted from said second register are all equal to zero; and
   (b) a fourth logic which transmits an output indicative of zero regardless of an output transmitted from said third register, if all bit outputs transmitted from said second register are equal to zero, and allows an output transmitted from said third register, to pass therethrough as it is, if all bit outputs transmitted from said second register are not equal to zero.

15. The circuit as set forth in claim 10, wherein said amplitude is stored in said function ROM on the assumption that a minimum address in said address regions of said function ROM corresponds to a phase angle of 0 degree in a periodic function having a period consisting of a phase angle of 360 degrees, a maximum address in said address regions of said function ROM corresponds to a phase angle of 90 degrees in said periodic function, and each of addresses intermediate between said minimum and maximum addresses corresponds to a phase angle obtained by equally discretizing phase angles ranging from said minimum phase angle to said maximum phase angle.

16. The circuit as set forth in claim 10, wherein said periodic function is a sine wave function.

17. The circuit as set forth in claim 10, wherein said periodic function have a waveform a period of which is in point symmetry and a half period of which is in line symmetry.

18. The circuit as set forth in claim 10, wherein said periodic function have a waveform a period of which is in line symmetry and a half period of which is in point symmetry.

* * * * *